Dec. 11, 1928.
H. G. PRIGGE
1,694,863
AUTOMOBILE LOCKING DEVICE
Filed Dec. 9, 1926
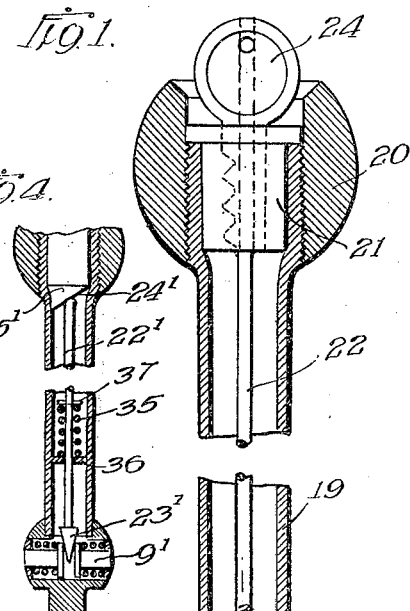
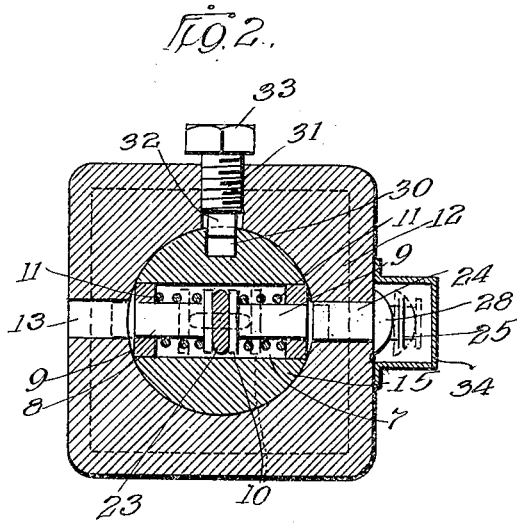
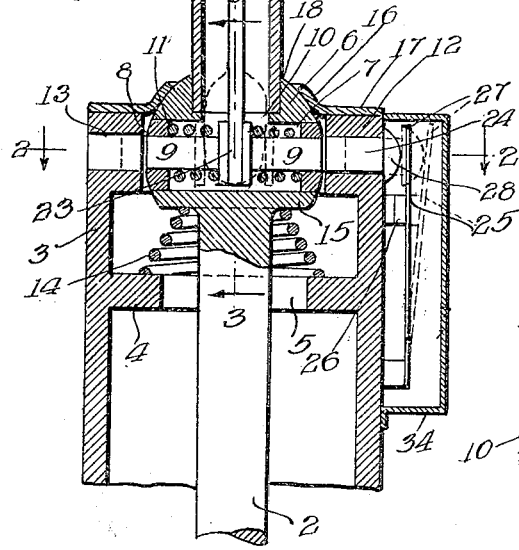
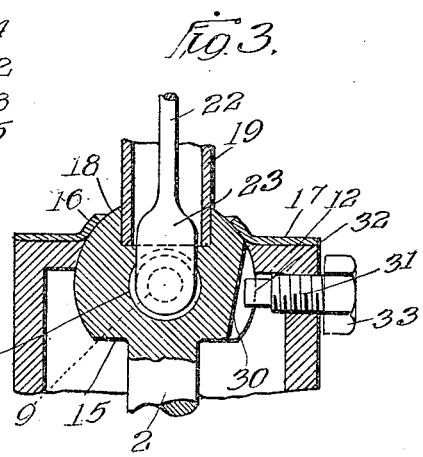
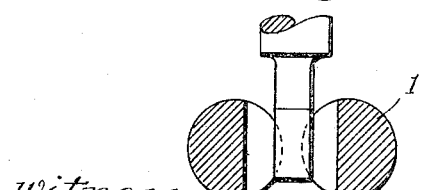
Witness
Harry C. L. White
Inventor:
Hugh G. Prigge
By Hill & Hill Attys.

Patented Dec. 11, 1928.

1,694,863

UNITED STATES PATENT OFFICE.

HUGH G. PRIGGE, OF SPRINGFIELD, ILLINOIS; BEATRICE M. PRIGGE, ADMINISTRATRIX OF SAID HUGH G. PRIGGE, DECEASED, ASSIGNOR TO BEATRICE M. PRIGGE.

AUTOMOBILE LOCKING DEVICE.

Application filed December 9, 1926. Serial No. 153,604.

This invention relates to new and useful improvements in locking devices and more particularly to a device of this character which is especially adapted to use in connection with the shifting mechanism of motor vehicle transmission. The main object of my invention is the provision of novel means whereby the shifting mechanism for the transmission of a motor vehicle may be readily locked when not in use to prevent use of the vehicle by an unauthorized person.

Another object of my invention is the provision of a locking device for the shifting mechanism of a motor vehicle which includes means whereby to simultaneously break the circuit of the ignition system so that it will be impossible to operate the vehicle without the proper means for unlocking the shifting mechanism which will simultaneously complete the circuit of the ignition system.

Another object of my invention is the provision of a locking device of the above character which includes means for retaining the shifting mechanism in operative position for the actuation of the locking device at all times and whereby the locking device may be, if so desired, carried by the usual transmission shift lever so that it is readily accessible to the operator of the vehicle, whereby the vehicle operating mechanism is quickly locked when not in use.

To this end my invention consists in the novel construction, arrangement and combination of parts herein shown and described, and more particularly pointed out in the claims.

In the drawings, wherein like reference characters indicate like or corresponding parts:

Fig. 1 is a vertical sectional view taken through the transmission shifting mechanism illustrating the application of my improved locking device;

Fig. 2 is a horizontal section on the line 2—2 of Fig. 1;

Fig. 3 is a detail sectional view on the line 3—3 of Fig. 1; and

Fig. 4 is a detailed longitudinal sectional view illustrating a slightly modified form of the invention.

Referring to the drawings in detail, the numeral 1 indicates the transmission operating bars which are actuated through contact with the lower section 2 of the shifting lever.

Surrounding the upper end of the lower section 2 of the shifting lever is a housing 3 formed with a horizontal partition 4 having a central opening 5 through which the section 2 extends, the said opening being of sufficient size to permit universal movement of the said section. Formed integral with the upper end of the section 2 is the usual ball member 6 used in connection with shifting devices of this character, said ball having a central chamber 7 with aligned openings 8 formed in the side walls of the ball and communicating with said chamber.

Mounted for sliding movement toward and away from each other within the chamber 7 and projecting at one end into the openings 8, are the locking pins 9. The inner ends of these pins are provided with disc-like heads 10 normally urged toward each other by means of the coil springs 11 which are mounted upon the pins and disposed between the heads 10 and the wall of the chamber 7.

The upper end of the housing 3 is provided with a substantially thick annular shoulder 12 and extending through the shoulder and the wall of the housing are the diametrically opposed openings 13 which are aligned with the openings 8 in the ball member 6 whereby the pins 9 may at any time be projected into these openings 13 for retaining the ball member against movement. The device is of substantially uniform construction in that a conical shaped coil spring 14 is mounted upon the partition 4 and bears against the lower substantially flat surface 15 of the member 6, normally urging the members 6 upwardly against the curved portion 16 of the cover plate 17 so that the lower end of the section 2 will be at all times properly positioned relative to the bars 1 so that these bars may be actuated for shifting the transmission.

With its lower end fitting into the recess 18 upon the upper side of the ball-like member 6 is the tubular shifting lever 19 preferably aligned with the lower section 2 and having at its outer end a removable hand grip 20.

Mounted in the outer end of the tubular lever 19 is a locking member 21 of any type having the barrel portion 2 connected with the actuating rod 22. This rod 22 extends throughout the length of the tubular lever 19 and, if the tubular lever be of the curved type, the rod 22 will be formed of flexible material sufficient to be operated through the curved part of the lever and the inner end of the rod is provided with a flat head portion 23 normally positioned flatwise between the disc-like heads 10. This head portion 23 is of a suitable thickness to permit the pins 9 to move inwardly against the same until the outer ends thereof are flush with the exterior surface of the ball member 6 as illustrated in Fig. 1, whereby the shifting device is free to be universally moved about for actuating the bars 1.

The lock member 21 is actuated through the medium of a key 24 and by the actuation of this key the rod 22 is rotated for shifting the pins 9 into a locking position, said pins being projected into the openings 13 in the housing, this operation moving the head portion 23 so that its marginal edges engage with the disc-like heads 10, retaining the pins in their locking position.

In order to provide means whereby the circuit of the ignition system may be broken at the time the shifting mechanism is locked, I arrange in the circuit a switch member which includes a movable contact 25 and a stationary contact 26, the stationary contact 26 being mounted upon the housing 3 in any suitable manner, while the movable contact 25 is carried by a spring 27 normally bearing against the head 28 of a movable pin 24 which is slidably mounted in one of the openings 13. From this construction it will be readily apparent that when the pins 9 are moved longitudinally within the openings 13, one of the pins will actuate the pin 24, moving the same outwardly and disengaging the contacts as shown by the dotted line position in Fig. 1, and thus the shifting mechanism will be locked and the circuit of the ignition system broken simultaneously with the locking of the shifting mechanism.

In order to retain the ball member 6 in proper position to have the pins 9 in alignment with the openings 13 at all times, the ball member is provided with a slot 30 and adjustable through the wall of the housing 3 is a locking screw 31, the inner end of which is formed with a reduced rounded portion 32 adapted to project into the slot 30 and the outer end formed with a head 33 which may be of any suitable shape to be engaged by a wrench or similar tool for adjusting this pin into and out of the slot 30. From this it will be noted that when the rounded end 32 of the member 31 is disposed within the slot 30, the ball member will be retained in such position as to have the openings 13 and 8 in alignment for quick actuation of the locking mechanism for the device.

In order to prevent ready access to the switch arranged in the circuit of the ignition system, a suitable housing 34 is attached to the side of the main housing 3 in any convenient way which will prevent an unauthorized person from gaining access to the switch members 25 and 26 for closing the circuit when the device is in locked position.

It will be apparent from the foregoing that I have provided simple and inexpensive locking means for the gear shifting mechanism of a motor vehicle and particular attention is directed to the fact that the actuating means for the locking device is housed within the operating lever 19 which not only protects the same against the elements, but provides means whereby the locking device may be readily actuated from a convenient position by the driver of the vehicle so that when the driver desires to leave the vehicle, the ignition system and the locking device may be quickly actuated simultaneously and again unlocked when it is desired to use the vehicle. Various types of connections may be used between the locked member at the outer end of the lever 19 and the means for actuating the pins 9, but it is preferred that such means be provided with sufficient flexibility to permit the same to conform to the different shapes of operating levers and at the same time include sufficient rigidity in order to actuate the pins.

In Fig. 4 I have illustrated a slightly modified form of the invention wherein a wedge shaped head 23' is formed on the lower end of the rod 22' and the upper end of the rod bears against the lower cam face 24' on the rotatable cylinder 25'. The wedge member 23' is normally positioned so that its lower end extends between the headed pins 9' and upon turning movement of the cam, the rod 22' will be forced downwardly to force the wedge 23' between the heads of the pins to force the pins outwardly against the tension of the springs 11'. In forcing the rod 22' downwardly it compresses the coil spring 35 which surrounds the rod and is disposed between the annular shoulder 26 upon the interior of the lever 19 and a cross pin 37 which is carried by the rod. From this it will be apparent that when the lock is actuated, it moves the cam so that its lowest point engages the upper end of the rod, and the wedge member 23' will be moved from between the heads of the pins 9' through the tension of the spring 35 which will bear against the pin 37 carried by the rod 22. This form of the invention can be used equally as well as the form illustrated in Figs. 1 to 3 inclusive.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A device of the character described including gear shifting means, a housing having opposed openings therein, locking means carried by the gear shifting means and adapted to be projected into said openings for locking said gear shifting means against movement, and means actuated by the locking means for breaking the circuit of the ignition system of a motor vehicle.

2. A device of the character described including gear shifting means, a housing having opposed openings therein, locking means carried by the gear shifting means and adapted to be projected into said openings for locking said shifting means against movement, and means for normally maintaining the locking means operatively positioned relative to said openings.

3. A device of the character described including gear shifting means, a housing having opposed openings therein, locking means including plungers carried by the gear shifting means said plungers adapted to be projected into said openings for locking said gear shifting means against movement, means for normally maintaining the locking means operatively positioned relative to said openings, and means actuated by one of said plungers of the locking means for breaking the circuit of the ignition system of a motor vehicle.

4. In a device of the character described and in combination, gear shifting means including an operating lever, a housing for the shifting means having opposed openings therein, locking means carried by the shifting means and adapted to be projected into said openings for locking the shifting means against movement, means for normally maintaining the locking means operatively positioned relative to said openings, and means housed within said lever for actuating said locking means.

5. A device of the character described including gear shifting means, locking means carried by the gear shifting means adapted to cooperate with a housing for retaining said shifting means against movement, means for actuating said locking means including a longitudinal movable rod having a wedge shaped head at one end, spring means normally maintaining the head in an inoperative position, and a manually operative cam having an inclined plane operating face engaging the opposite end of the rod for moving the wedge into actuating position against the tension of the spring.

In testimony whereof, I have hereunto signed my name.

HUGH G. PRIGGE.